(12) United States Patent
Rocquelay et al.

(10) Patent No.: US 11,411,741 B2
(45) Date of Patent: Aug. 9, 2022

(54) SECURE DATA TRANSMISSION METHOD

(71) Applicant: SAGEMCOM BROADBAND SAS, Rueil Malmaison (FR)

(72) Inventors: Antonie Rocquelay, Rueil Malmaison (FR); Olivier Mevissen, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 153 days.

(21) Appl. No.: 16/860,802

(22) Filed: Apr. 28, 2020

(65) Prior Publication Data

US 2020/0351102 A1    Nov. 5, 2020

(30) Foreign Application Priority Data

May 2, 2019   (FR) ...................................... 1904620

(51) Int. Cl.
*H04L 9/32*     (2006.01)
*H04L 9/08*     (2006.01)
*H04L 9/40*     (2022.01)

(52) U.S. Cl.
CPC .......... *H04L 9/3242* (2013.01); *H04L 9/0819* (2013.01); *H04L 63/0435* (2013.01); *H04L 63/0442* (2013.01)

(58) Field of Classification Search
None
See application file for complete search history.

(56) References Cited

U.S. PATENT DOCUMENTS 9,584,493 B1 * 2/2017 Leavy ................... H04L 63/104
10,623,186 B1 * 4/2020 Mehr .................... H04L 9/3226

(Continued)

FOREIGN PATENT DOCUMENTS

CN       105376589 A      3/2016
WO    WO-2017095303 A1 *  6/2017

OTHER PUBLICATIONS

Verschoor. "Omemo: Cryptographic Analysis Report." Jun. 1, 2016, XP055670126, Excerpt from the Internet: URL:https://conversations.im/omemo/audit.pdf.

(Continued)

*Primary Examiner* — Benjamin E Lanier

(74) *Attorney, Agent, or Firm* — Oliff PLC

(57) ABSTRACT

In a secure end-to-end transmission of data between a first device and a second device via a message broker, the following are performed: a sharing of an entropy pool between the first device and the second device via the message broker, by means of signalling messages, any payload of which is encrypted asymmetrically and which comprise a message signature; and a transmission of subsequent messages between the first device and the second device via the message broker, each said subsequent message comprising a header and a payload, the header comprising an identifier of an authentication key obtained from the shared entropy pool and an identifier of a symmetrical encryption key obtained from the shared entropy pool, the payload being encrypted symmetrically by means of the symmetrical encryption key, and the whole formed by the header and the payload being authenticated by means of a message authentication code obtained by means of the authentication key and inserted in the header. Thus, the subsequent messages benefit from the non-repudiation afforded by the way in which the entropy pool was previously shared.

15 Claims, 6 Drawing Sheets

(56) References Cited

U.S. PATENT DOCUMENTS

| | | | | |
|---|---|---|---|---|
| 2006/0274899 A1* | 12/2006 | Zhu | .................. | H04L 63/02 |
| | | | | 380/281 |
| 2010/0061272 A1* | 3/2010 | Veillette | .................. | H04L 45/20 |
| | | | | 370/254 |
| 2012/0204032 A1* | 8/2012 | Wilkins | .............. | H04L 63/0428 |
| | | | | 713/170 |
| 2016/0241389 A1* | 8/2016 | Le Saint | ............... | H04L 9/0844 |

OTHER PUBLICATIONS

Frosch et al. "How Secure is TextSecure?" 2016 IEEE European Symposium on Security and Privacy, May 1, 2016, pp. 457-472, XP055566892.

Rosler et al. "More is Less: On the End-to-End Security of Group Chats in Signal, WhatsApp, and Threema." IACR, International Association for Cryptologic Research, vol. 20180219:133524, Jan. 6, 2018, pp. 1-30, Excerpt from the Internet: URL:http://eprint.iacr.org/2017/713.pdf.

Dierks. "RFC 5246—The Transport Layer Security (TLS) Protocol Version 1.2" Aug. 31, 2008, XP055270691, Excerpt from the Internet: URL:https://tools.ietf.org/html/rfc5246.

\* cited by examiner

SECURE DATA TRANSMISSION METHOD

TECHNICAL FIELD

The present invention relates to a method for the secure transmission of data in a transmission architecture arranged around a message broker, sometimes also referred to as a "messaging broker" or "message agent" or "messaging agent".

PRIOR ART

A message broker acts as an intermediary between various elements that must communicate with each other, thus allowing decoupling of these various elements. A difficulty is posed when the various elements communicating with each other must absolutely meet secure end-to-end transmission constraints. This is because the use of a message broker in the data transmission chain by definition introduces an intermediary that weakens the protection of the data.

More precisely, an end-to-end communication can be protected by means for example of the TLS (Transport Layer Security) protocol, which, in a client-server relationship, ensures the basic authentication of the server (simple authentication) and of the client if the server so requests (mutual authentication), as well as the confidentiality and the integrity of the data exchanged. The presence of a message broker then makes it necessary to use the TLS protocol between the message broker and each of the various elements that must communicate with each other, but the end-to-end security constraints are no longer complied with because the message broker then itself has access to the non-encrypted data exchanged between said various elements. In addition, this type of message broker is specific, because of the support of the security protocols such as TLS or SASL (Simple Authentication and Security Layer). In addition, considering messaging addressing millions of users, as is the case for example with television-on-internet systems, it is extremely expensive in terms of resources to rely on mutually authenticated connections since, in this case, it is necessary to provide each user with a unique dedicated certificate and to manage a Public Key Infrastructure PKI able to deliver a quantity of certificates adapted to the quantity of potential users.

It is possible to add an encryption and an authentication to each message exchanged via the message broker, in order to ensure end-to-end security and to limit the carrying of the payload of a message to the addressee of this payload. A first approach then consists of using an asymmetric encryption on the payload of the message and a signature on the complete message, in order to ensure confidentiality and non-repudiation, and to use only pairs of private/public keys, which are easy to manage but which require significant processing resources (e.g. CPU (central processing unit) capacities. However, this first approach is not applicable in the case of embedded equipment having small processing resources and having to send/receive many messages, as is the case in the Internet of Things IoT. A second approach consists of using asymmetrical encryption on the payload of the message, a signature on the complete message and the transportation, for the symmetrical encryption, of a secret key, itself encrypted asymmetrically, in order to ensure confidentiality and non-repudiation, and here again using pairs of public/private keys. However, this second approach merely slightly relieves the requirement for processing resources compared with the first approach, solely eliminating the requirement for asymmetric encryption on the payload of the message. A third approach consists of using a message authentication code, e.g. of the HMAC (Keyed-Hash Message Authentication Code) type, on the complete message, and an asymmetric encryption on the payload of the message, in order to ensure confidentiality and authentication. However, this third approach is not applicable since it involves a loss of non-repudiation compared with the previous two approaches.

It is then desirable to overcome these drawbacks of the prior art.

It is in particular desirable to provide a solution that ensures end-to-end security despite the presence of the message broker, and this in such a way as to be capable of supporting communicating equipment having varied processing capacities (i.e. which may be either processing resources of embedded equipment or cloud processing resources).

It is in particular desirable to provide a solution that is adapted both to message brokers using mechanisms of the Publish-Subscribe type and to message brokers using mechanisms of the routed RPC (Remote Procedure Call) type.

DISCLOSURE OF THE INVENTION

One object of the present invention is to propose a method for secure end-to-end transmission of data between a first device and a second device via a message broker, characterised in that the method comprises the following steps: sharing of an entropy pool (requiring non-repudiation, integrity and confidentiality) between the first device and the second device via the message broker, by means of signalling messages, any payload of which is encrypted asymmetrically providing confidentiality and which comprise a message signature providing non-repudiation and integrity; and transmission of subsequent messages between the first device and the second device via the message broker, each said subsequent message comprising a header and a payload, the header comprising an identifier of an authentication key (requiring authentication and integrity) obtained from the shared entropy pool (providing authentication and integrity) and an identifier of a symmetrical encryption key (requiring authentication and integrity) obtained from the shared entropy pool (possessing non-repudiation), the payload being encrypted symmetrically providing confidentiality by means of the symmetrical encryption key, and the whole formed by the header and the payload being authenticated by means of a message authentication code (providing authentication and integrity) obtained by means of the authentication key and inserted in the header. Thus end-to-end security is ensured, while minimising the processing resources requirement through the use of asymmetrical encryption that inherited the non-repudiation provided by the way in which the entropy pool was previously shared between the first device and the second device.

According to a particular embodiment, the message authentication code is of the HMAC type. Thus end-to-end security is reinforced.

According to a particular embodiment, the authentication key is obtained by aggregation of first data stored in the entropy pool and the identifier of the authentication key is obtained by aggregation of indices corresponding to said first data in the entropy pool. Thus numerous authentication keys can easily be generated and identified by means of an entropy pool with a simple structure.

According to a particular embodiment, the authentication key is obtained by aggregation of first data stored in the entropy pool and the identifier of the authentication key is an index of an index aggregation table at which the aggregation of the indices corresponding to said first data in the entropy pool is stored.

According to a particular embodiment, the symmetrical encryption key is obtained by aggregation of second data stored in the entropy pool and the identifier of the symmetrical encryption key is obtained by aggregation of indices corresponding to said second data in the entropy pool. Thus numerous symmetrical encryption keys can easily be generated and identified by means of an entropy pool with a simple structure.

According to a particular embodiment, the symmetrical encryption key is obtained by aggregation of second data stored in the entropy pool and the identifier of the authentication key is an index of an index aggregation table at which the aggregation of the indices corresponding to said second data in the entropy pool is stored.

According to a particular embodiment, the first device performs, in the same way, secure end-to-end transmissions and receptions of data with a third device via the message broker, using the same entropy pool as with the second device. Thus the first device, the second device and the third device easily operate in the same group environment protected end-to-end.

According to a particular embodiment, the first device performs, in the same way, secure end-to-end transmissions and receptions of data with a third device via the message broker, using an entropy pool distinct from the entropy pool used with the second device. Thus the first device and the second device on the one hand and the first device and the third device on the other hand easily operate in private environments protected from end-to-end. According to a particular embodiment, the first device performs secure end-to-end transmissions of data to the second device and a third device via the message broker, using an entropy pool dedicated solely to the transmission of messages coming from the first device. Thus only the first device easily operates in transmission, and the second and the third device operate in reception, in a private environment and protected from end-to-end. According to a particular embodiment, the first device performs secure end-to-end receptions of data coming from the second device and from a third device via the message broker, using an entropy pool dedicated to the reception of messages by the first device. Thus only the first device operates easily in reception, and the second device and the third device operate in transmission to the first device, in a private environment protected end-to-end.

According to a particular embodiment, the first device is a television set-top box and the second device is a terminal configured and adapted to control the television set-top box via a secure end-to-end transmission of data. Thus the television set-top box is easily controlled in a secure manner.

According to a particular embodiment, the first device is a cloud and the second device is a terminal configured and adapted for transmitting analytical data to the cloud via the secure end-to-end transmission of data. Thus the cloud easily receives the analytical data in a secure manner.

According to a particular embodiment, the entropy pool is stored, in the cloud, in a database accessible to each application instance in communication with the second device. Thus duplication of the entropy pool among the application instances is avoided, which makes it possible to easily apply access control to the entropy pool by the application instances of the cloud.

The invention also relates to a computer program, which can be stored on a medium and/or downloaded from a communication network, in order to be read by a processor. This computer program comprises instructions for implementing the method mentioned above in any one of the embodiments thereof, when said program is executed by the processor. The invention also relates to an information storage medium storing such a computer program.

The invention also relates to a device, called the first device, adapted and configured for performing a secure end-to-end transmission of data with a second device via a message broker. The first device comprises: means for sharing an entropy pool between the first device and the second device via the message broker, by means of signalling messages any payload of which is encrypted asymmetrically and which comprise a message signature; and means for transmitting subsequent messages between the first device and the second device via the message broker, each said subsequent message comprising a header and a payload, the header comprising an identifier of an authentication key obtained from the shared entropy pool and an identifier of a symmetrical encryption key obtained from the shared entropy pool, the payload being encrypted symmetrically by means of the symmetrical encryption key, and the whole formed by the header and the payload being authenticated by means of a message authentication code obtained by means of the authentication key and inserted in the header.

BRIEF DESCRIPTION OF THE DRAWINGS

The features of the invention mentioned above, as well as others, will emerge more clearly from a reading of the following description of at least one example embodiment, said description being made in relation to the accompanying drawings, among which.

DETAILED DISCLOSURE OF EMBODIMENTS

The following description presents a secure end-to-end data transmission from a first device to a second device via a message broker, comprising: sharing of an entropy pool between the first device and the second device via the message broker, by means of signalling messages, any payload of which is encrypted asymmetrically and which comprise a message signature; and transmission of subsequent messages between the first device and the second device via the message broker, each said subsequent message comprising a header and a payload, the header comprising an identifier of an authentication key obtained from the shared entropy pool and an identifier of a symmetrical encryption key obtained from the shared entropy pool, the payload being encrypted symmetrically by means of the symmetrical encryption key, and the whole formed by the header and the payload being authenticated by means of a message authentication code obtained by means of the authentication key and inserted in the header. The description that follows presents this secure end-to-end data transmission in a communication system (wherein the message broker may or may not be included in the communication system in question), examples of which are illustrated in FIGS. 1 and 2.

Figure 1:
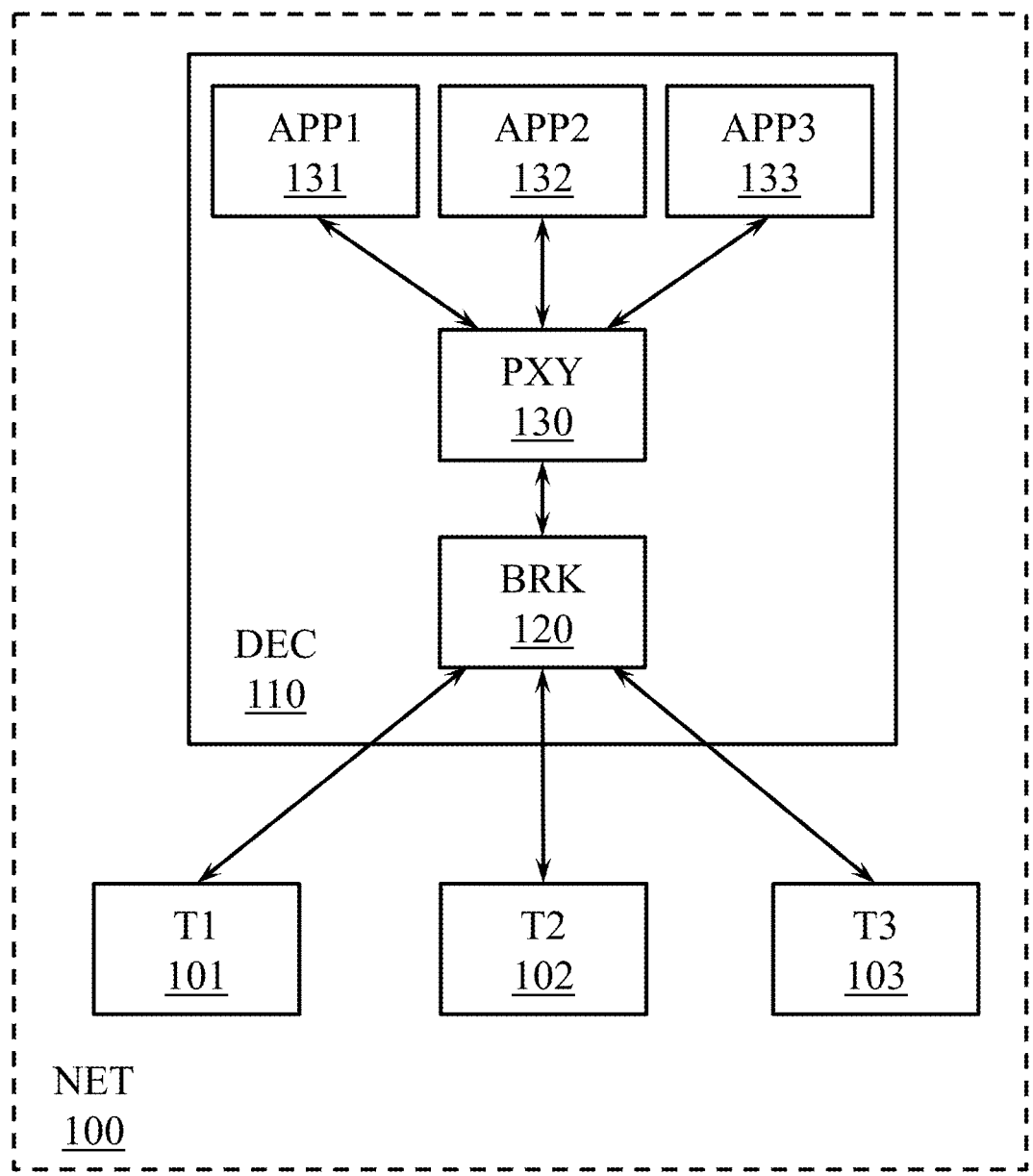
FIG. 1 illustrates schematically a first example of a communication system wherein the present invention can be implemented.
Figure 2:
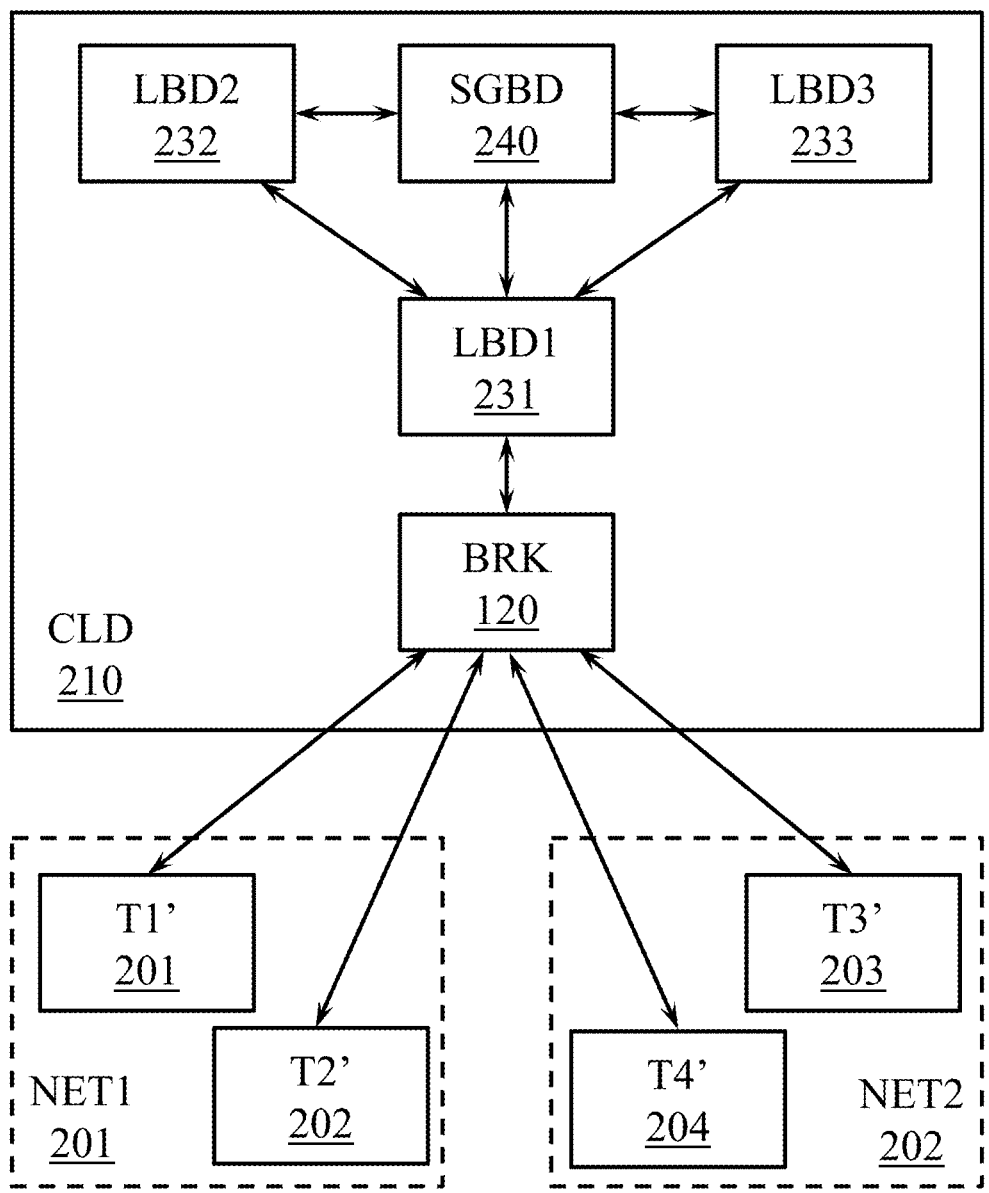
FIG. 2 illustrates schematically a second example of the communication system.

FIG. 1 thus illustrates schematically a first example of a communication system wherein the present invention can be implemented.

In FIG. 1, the communication system lies in a home network NET 100. The communication system comprises a television set-top box DEC 110 adapted and configured to decode audiovisual streams. These audiovisual streams are typically received by the television set-top box DEC 110 from a distribution network, such as the internet. For example, the television set-top box DEC 110 is connected to a residential gateway providing access to the internet to enable the television set-top box DEC 110 to receive these audiovisual streams.

In the home network NET 100, the television set-top box DEC 110 is connected, for example by means of wireless connections of the Wi-Fi (registered trade mark) type, to at least one terminal T1 101, T2 102, T3 103. For example, the terminal T1 101 is a smartphone, the terminal T2 102 is a tablet and the terminal T3 103 is a laptop. Each terminal T1 101, T2 102, T3 103 is adapted and configured to remotely control the television set-top box DEC 110.

The television set-top box DEC 110 comprises one or more applications APP1 131, APP2 132, APP3 133. The television set-top box DEC 110 further comprises a message broker BRK 120, for example of the WAMP (Web Application Messaging Protocol) type. Each terminal T1 101, T2 102, T3 103 comprises an application adapted and configured to communicate with one or more applications APP1 131, APP2 132, APP3 133 of the television set-top box DEC 110 by means of the message broker BRK 120.

When the television set-top box DEC 110 comprises a plurality of applications APP1 131, APP2 132, APP3 133, the television set-top box DEC 110 may include a proxy application PXY 130 serving as an intermediary internal to the television set-top box DEC 110 between the message broker BRK 120 and the applications APP1 131, APP2 132, APP3 133.

The invention makes it possible to protect the exchanges between each terminal application T1 101, T2 102, T3 103 and each application APP1 131, APP2 132, APP3 133, or at least between each terminal application T1 101, T2 102, T3 103 and the proxy application PXY 130. To do this, an entropy pool is shared between each application APP1 131, APP2 132, APP3 133 of the television set-top box DEC 110 and each terminal application T1 101, T2 102, T3 103 enabled to exchange with said application of the television set-top box DEC 110. When the proxy application PXY 130 is present, the entropy pool is shared between the proxy application PXY 130 of the television set-top box DEC 110 and each terminal application T1 101, T2 102, T3 103 enabled to exchange with one or more applications APP1 131, APP2 132, APP3 133 of the television set-top box DEC 110.

This first example of a communication system is particularly adapted to a sharing of the same entropy pool with a group of applications (terminal applications and applications APP1 131, APP2 132, APP3 133, or proxy application PXY 130, of the television set-top box DEC 110) using services of the message broker BRK 120. Nothing however prevents the use therein of an entropy pool dedicated to each terminal application using services of the message broker BRK 120.

It should be noted that, although the message broker BRK 120 is included in FIG. 1 in the television set-top box DEC 110, the message broker BRK 120 can also be installed in a third device of the home network NET 100. The communications in the home network NET 100 with the message broker BRK 120 may be protected by means for example of the TLS protocol supplemented by the SASL protocol. As explained in the introductory part, this makes it possible to protect the data exchanges with the message broker BRK 120 (exchange protocol with the message broker BRK 120), but not to protect the end-to-end data exchanges between applications. This affords an additional degree of protection but does not meet the problem of lack of security raised by the presence of the message broker BRK 120 itself.

FIG. 2 illustrates schematically a second example of a communication system wherein the present invention can be implemented.

In FIG. 2, the communication system comprises a cloud system CLD 210, to which at least one terminal T1' 201, T2' 202, T3' 203, T4' 204, is connected, for example by means of the internet. As a reminder, a cloud system is one or more tranches, typically in the form of virtual machines, in a server farm. For example, the terminals T1' 201, T2' 202 belong to a first home network NET1 201 and the terminals T3' 203, T4' 204 belong to a second home network NET2 202. For example, the terminals T1' 201 and T3' 203 are residential gateways and the terminals T2' 202 and T4' 204 are television set-top boxes accessing the internet via said residential gateways.

The cloud system CLD 210 comprises one or more software instances of an application, called lambda functions in the functionalities offered by the services of the cloud system of Amazon Web Services (registered trade mark). The cloud system CLD 210 further comprises the message broker BRK 120, for example of the WAMP type. Each terminal T1' 201, T2' 202, T3' 203, T4' 204 comprises an application adapted and configured to communicate with one or more application instances LBD1 231, LBD2 232, LBD3 233 of the cloud system CLD 210 by means of the message broker BRK 120. As illustrated in FIG. 2, it is possible for an application instance LBD1 231 to serve as an intermediary between at least one other application instance LBD2 232, LBD3 233 and the message broker BRK 120.

The cloud system CLD 210 further comprises a database SGBD 240 (for example a database of the REDIS (REmote Dictionary Server) type in memory) shared by the application instances LBD1 231, LBD2 232, LBD3 233. Y is stored in each entropy pool to be shared between the cloud system CLD 210 and the applications of the terminals T1' 201, T2' 202, T3' 203, T4' 204.

The invention thus makes it possible in particular to transfer analytical data from the terminals T1' 201, T2' 202, T3' 203, T4' 204 to the cloud system CLD 210 in order to be processed by machine learning with a view to optimising the configurations of the terminals T1' 201, T2' 202, T3' 203, T4' 204 and/or other terminals.

This second example of a communication system is particularly adapted to a sharing of an entropy pool dedicated to each terminal application using services of the message broker BRK 120. The exchanges between each of the terminals T1' 201, T2' 202, T3' 203, T4' 204 and the cloud system CLD 210 are thus perfectly isolated from each other.

This second example of a communication system is also particularly adapted, in a variant, to an entropy pool being dedicated to transmissions of secure data end-to-end from a first device to other devices (at least one second device and one third device). An entropy pool is then dedicated solely to the sending of messages coming from the first device via the message broker BRK 120 and to the reception of these messages by said other devices (for the deciphering of the messages sent by said first device via the message broker BRK 120). The same entropy pool then does not apply in both communication directions. This approach could also apply in the context of the first example of a communication system. This second example of a communication system is also particularly adapted, in another variant or as a complement to the previous variant, to an entropy pool being dedicated to secure end-to-end receptions of data to a first device from other devices (at least one second device and one third device). An entropy pool is then dedicated solely to the sending of messages to the first device via the message broker BRK 120 and to the reception of these messages by said first device (for the deciphering of these messages by said first device). As in the previous variant, the same entropy pool then does not apply in both communication directions. This approach could also apply in the context of the first example of a communication system.

It should be noted that, although the message broker BRK 120 is included, on FIG. 2, in the cloud system CLD 210, the message broker BRK 120 may also be installed in a third device. The communications with the message broker BRK 120 can be protected by means for example of the TLS protocol supplemented by the SASL protocol. As explained in the introductory part, this makes it possible to protect the data exchanges with the message broker BRK 120 (protocol for exchanges with the message broker BRK 120) but not to protect the end-to-end data exchanges between a terminal application and an application instance in the cloud system CLD 210. As with the context in FIG. 1, this affords an additional degree of protection, but does not meet the problem of lack of security raised by the presence of the message broker BRK 120 itself.

As detailed hereinafter, the entropy pool is shared by means of encrypted signalling messages by means of an asymmetric encryption in order to satisfy the requirements for confidentiality and further comprises a message signature in order to satisfy the non-repudiation requirements. The entropy pool thus inherits the non-repudiation provided by means of the signature of the signalling message serving to transmit, and thus share, the entropy pool. This inheritance then makes it possible, in subsequent data message exchanges, to use only a message authentication code MAC, e.g. of the HMAC type, and asymmetrical encryption using the shared entropy pool without calling into question the non-repudiation requirements. For the record, a message authentication code MAC is a code accompanying data for the purpose of ensuring the integrity thereof, by checking that they have not undergone any modification. The message authentication code MAC not only fulfils a function of checking the integrity of the message, as would be allowed by a simple hash function, but in addition fulfils an authentication function, by means of a secret-key sharing. A message authentication code of the HMAC type is a message authentication code MAC that is calculated using a cryptographic hash function in combination with the secret key, for greater robustness.

Thus, once the entropy pool has been shared, the processing resources necessary for the encryption of the messages to be transmitted by means of the message broker BRK 120 and for the deciphering of the messages received by means of the message broker BRK 120 remain small compared with asymmetric encryption mechanisms. This means that the invention makes it possible to support communication equipment having varied processing capacities (i.e. able to be either embedded-equipment processing resources or cloud processing resources), optionally within the same communication system.

Figure 3:
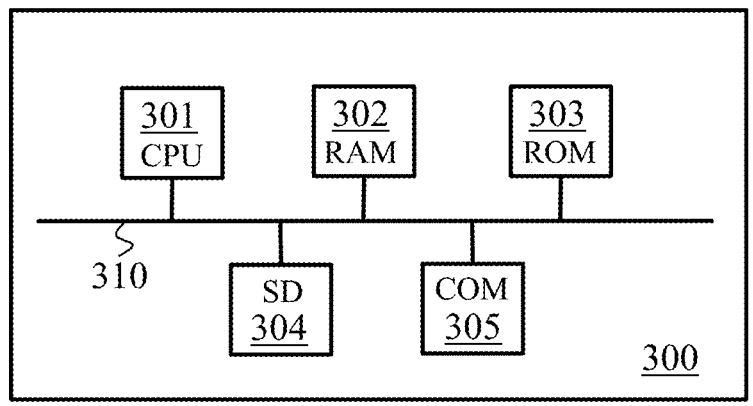
FIG. 3 illustrates schematically an example of a hardware arrangement of the device of the communication system.

FIG. 3 illustrates schematically an example of hardware architecture of a hardware arrangement of devices in the communication system, such as for example the terminals T1 101, T2 102, T3 103 and/or the terminals T1' 201, T2' 202, T3' 203, T4' 204 and/or the television set-top box DEC 110 and/or servers forming the cloud system CLD 210.

The example of hardware architecture presented comprises, connected by a communication bus 310: a processor CPU 301; a random access memory RAM 302; a read only memory ROM 303 or a flash memory; a storage unit or a storage medium reader, such as an SD (Secure Digital) card reader 304 or a hard disk HDD (hard disk drive); and at least one set of communication interfaces COM 305. The set of communication interfaces COM 305 enables the communication device in question to communicate in the communication system and more particularly via the message broker BRK 120.

The processor CPU 301 is capable of executing instructions loaded in the RAM memory 302 from the ROM memory 303, from an external memory (such as an SD card), from a storage medium (such as the hard disk HDD), or from a communication network. On powering up, the processor CPU 301 is capable of reading instructions from the RAM memory 302 and executing them. These instructions form a computer program causing the implementation, by the processor CPU 301, of all or some of the algorithms and steps described here.

Thus all or some of the algorithms and steps described here can be implemented in software form by the execution of a set of instructions by a programmable machine, such as a DSP (digital signal processor) or a microcontroller or a processor. All or some of the algorithms and steps described here can also be implemented in hardware form by a machine or a dedicated component, such as an FPGA (field-programmable gate array) or an ASIC (application-specific integrated circuit). Thus the communication device in question comprises electronic circuitry adapted and configured to implement the algorithms and steps described here.

Figure 4:
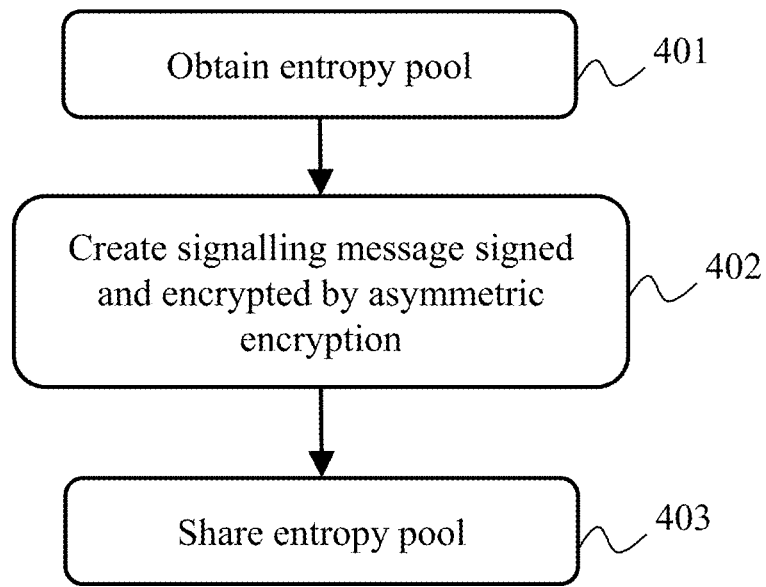
FIG. 4 illustrates schematically an entropy-pool sharing algorithm.

FIG. 4 illustrates schematically an entropy-pool sharing algorithm. We shall consider by way of illustration that the entropy pool is supplied by the proxy application PXY 130. In a step 401, the proxy application PXY 130 obtains an entropy pool. The entropy pool is for example obtained by configuration of the proxy application PXY 130 (e.g. at the installation or the manufacture or an updating of the television set-top box DEC 110). The proxy application PXY 130 obtains the entropy pool by reading a memory area in which the entropy pool is stored. In the case of the application instance LBD1 231 of the cloud system CLD 210 in FIG. 2, the application instance LBD1 231 obtains the entropy pool from the database SGBD 240.

The entropy pool is a set of data able to generate authentication keys and symmetrical encryption keys. The authentication keys and the symmetrical encryption keys are identified by means of respective identifiers making it possible to find the corresponding data in the entropy pool.

Preferentially, the authentication keys and the symmetrical encryption keys are generated by aggregation of data stored in the entropy pool. For example, the data are expressed in 8 bits and the authentication keys and the symmetrical encryption keys are generated by aggregating 16 data items of 8 bits in order to form 128-bit keys. Each data item (e.g. of 8 bits) is identified in the entropy pool by means of an index value that is particular to it. This arrangement is illustrated schematically in FIG. 10 for an entropy pool labelled EntropyPool_1. It is thus possible to create an identifier of an authentication key or of a symmetrical encryption key by aggregation of index values of the data constituting said key. The same data item can be used several times to form an authentication key or a symmetrical encryption key, which means that the index value thereof appears several times in the identifier of the key in question. We shall consider by way of example an authentication key of 128 bits defined as follows:
0x057E004F480856260891F6FF56F10548

The authentication key thus defined can then be identified by means of the aggregation of the indices of the corresponding 8-bit data in the entropy pool illustrated in FIG. 10 as follows:
{1; 10; 19; 15; 14; 6; 0; 3; 6; 11; 16; 18; 0; 5; 1; 14}

This approach makes it possible to exchange authentication key identifiers and symmetrical encryption key identifiers, from which only those who have knowledge of the entropy pool can find the keys in question.

In a particular embodiment, it is also possible to use an index aggregation table. The aforementioned index aggregations that define the authentication keys and the symmetrical encryption keys can be stored in said index aggregation table as said keys are created. In other words, it is necessary to provide the index aggregation in question only in the first message in which the key in question is defined. It is then possible to use subsequently, in place of the index aggregation that defines such and such a key, the index in said index aggregation table at which the index aggregation that forms said key is stored.

In a step 402, the proxy application PXY 130 creates a signalling message intended to share the entropy pool obtained at the step 401. The signalling message is encrypted by means of an asymmetric encryption in order to satisfy the confidentiality requirements and further comprises a message signature in order to satisfy the non-repudiation requirements. The encryption is performed using a public key of the addressee or addressees of the entropy pool. The addressee or addressees use their private key (the same set of private and public keys is common to a plurality of addressees in the case of group sharing) to decode the message, in order thus to recover the entropy pool transmitted. The signature is performed with the private key of the sender (i.e. of the proxy application PXY 130 in the example dealt with here). The addressee or addressees then use the public key of the sender in order to check the authenticity of the message received. The knowledge of the public keys of the participants is a preliminary to the sharing of the entropy pool. This can be done by configuration or by exchange of messages in clear with authentication and integrity, the non-encryption of the message not posing any security problem since only the public key can verify the signature of a message made with the corresponding private key and only the private key can decipher a message encrypted with the corresponding public key.

In a step 403, the proxy application PXY 130 shares the entropy pool obtained at step 401, transmitting, to the addressee or addressees, the signalling message created at step 402. The entropy pool is then shared by means of the message broker BRK 120. The asymmetric encryption applied prevents the message broker BRK 120 from being able to access the content of the entropy pool, by ensuring that the signalling message can be deciphered only by the addressee or addressees targeted. The signature assures the addressee or addressees that the entropy pool is actually supplied by the expected sender (i.e. of the proxy application PXY 130 in the example dealt with here).

The algorithm in FIG. 4 is preferentially triggered at the initiative of the addressee or addressees of the entropy pool. The algorithm in FIG. 4 may in a variant be triggered at the initiative of the sender of the entropy pool. The algorithm in FIG. 4 can thus be reiterated in order to update the entropy pool, for example regularly.

An example of a procedure for sharing the entropy pool is detailed hereinafter in relation to FIG. 5. An example of a signalling message format adapted to the sharing of the entropy pool is detailed below in relation to FIG. 6.

Once the entropy pool has thus been shared, it is possible to use a symmetrical encryption based on the use of this entropy pool, non-repudiation then being inherited from the asymmetric encryption and from the signature used for sharing said entropy pool.

Examples of message formats protected by means of the entropy-pool sharing are detailed hereinafter in relation to FIGS. 7 and 8.

Figure 5:
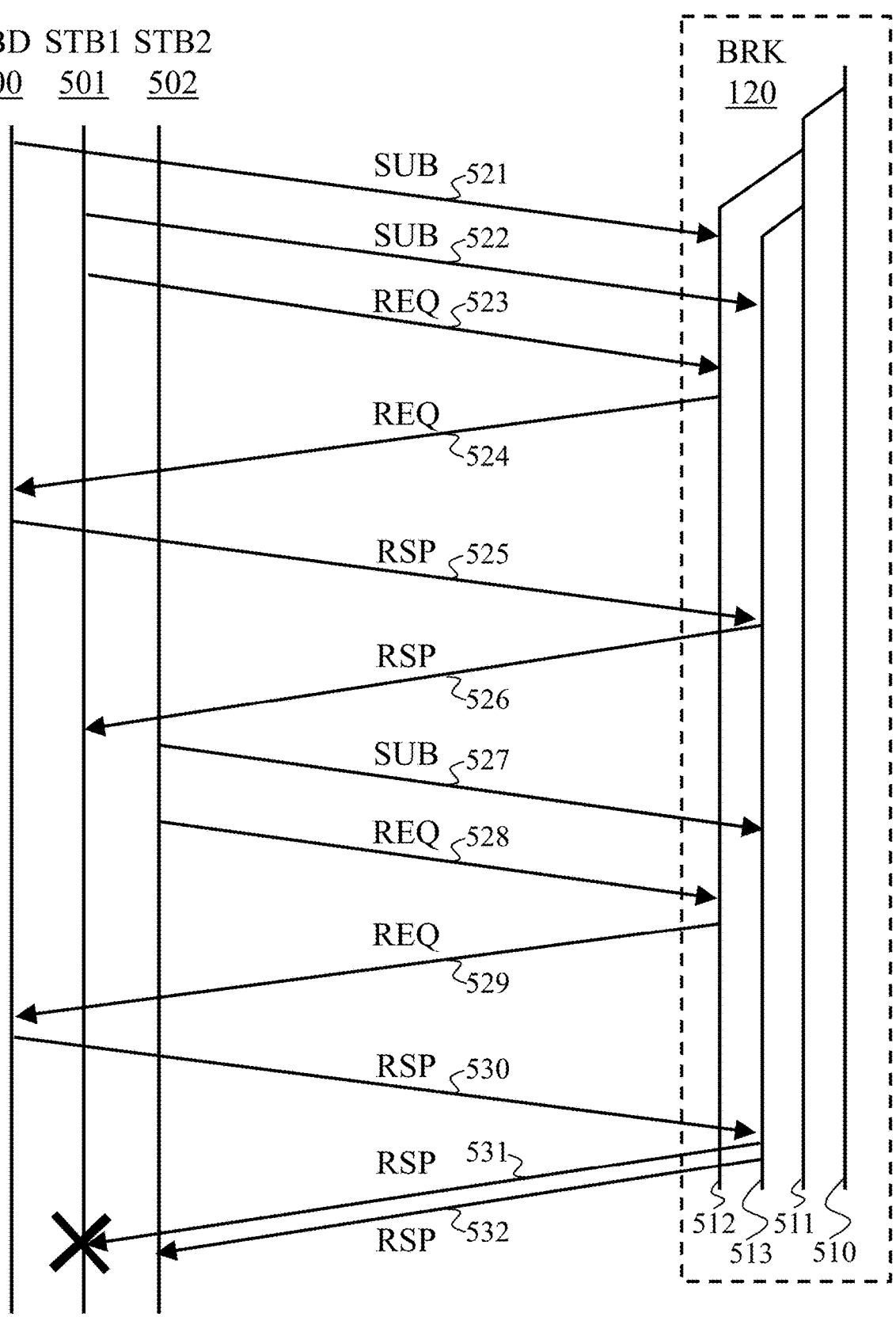
FIG. 5 illustrates schematically an example of exchanges for the entropy pool sharing.

FIG. 5 illustrates schematically an example of exchanges for entropy pool sharing. The example in FIG. 5 is based on the example of a communication system in FIG. 2. In FIG. 5, the sharing of two entropy pools is implemented: a first sharing between an application instance LBD 500 (e.g. the application instance LBD1 231) and a first television set-top box STB1 501, and a second sharing between the application instance LBD 500 and a second television set-top box STB2 502.

The message broker BRK 120 preferentially uses a topics tree. These topics are anchoring points on the messaging. It is thus possible to post messages by pointing to a given topic, that is to say pointing to a corresponding node of the tree, and to receive these messages by subscription or registration with the topic. The topics furthermore make it possible to easily manage access control. In a similar manner, a hierarchical data model can be used, which makes it possible to make generic the types of message exchanged.

For example, the topics tree comprises a root 510, denoted "/Root", on which a first node 511 denoted "/Root/EntropyPool" is dependent. A second node 512 denoted "/Root/EntropyPool/Req" and a third node 513 denoted "/Root/EntropyPool/Ntfy" are dependent on the first node 511. Topics are thus specifically defined in order on the one hand to request an entropy pool and on the other hand to transmit the required entropy pool in response.

In a step 521, the application instance LBD 500 transmits to the message broker BRK 120 a first subscription message SUB targeting the node 512 of the topics tree. The message broker BRK 120 then records that the application instant LBD 500 has taken out a subscription via the node 512.

In a step 522, the first television set-top box STB1 501 transmits to the message broker BRK 120 a second subscription message SUB targeting the node 513 of the topics tree. The message broker BRK 120 then records that the first television set-top box STB1 501 has taken out a subscription via the node 513.

Subsequently, in a step 523, the first television set-top box STB1 501 sends a first request REQ targeting the node 512 of the topics tree. The first request REQ is intended for the application instance LBD 500 (which is preferentially the application instance LBD1 231 acting as an entry point of the cloud system CLD 210) and requests a transmission of an entropy pool for the first television set-top box STB1 501. The first request REQ is signed with the private key of the source, namely the first television set-top box STB1 501. It is not strictly necessary for the first request REQ to contain a payload. If such is the case, the payload is encrypted asymmetrically with the public key of the addressee, namely the application instance LBD 500 (which is preferentially the application instance LBD1 231 acting as an entry point of the cloud system CLD 210), in order to ensure confidentiality thereof. For example, the first request REQ is in accordance with the format illustrated in FIG. 6. In the step 523, the first request REQ is encapsulated in a message in accordance with the protocol for exchanges with the message broker BRK 120, which means that, through this encapsulation, the message is sent by the first television set-top box STB1 501 to the message broker BRK 120.

In a step 524, the message broker BRK 120 detects that the first request REQ is targeting the node 512 of the topics tree, via which the application instance LBD 500 took out a subscription at the step 521, and then propagates the first request REQ to the application instance LBD 500. To do this, the message broker BRK 120 de-encapsulates the message transmitted by the first television set-top box STB1 501 and re-encapsulates the first request REQ in a message in accordance with the protocol for exchanges with the message broker BRK 120, which means that, through this encapsulation, the message is sent by the message broker BRK 120 to the application instance LBD 500.

In a step 525, the application instance LBD 500 de-encapsulates the message received from the message broker BRK 120. The application instance LBD 500 checks that the first request REQ is signed with the private key of the first television set-top box STB1 501 from which said first request REQ comes.

If the first request REQ is not correctly signed, the application instance LBD 500 ignores the first request REQ.

If the first request REQ is correctly signed and the first request REQ contains a payload, the application instance LBD 500 deciphers the payload with its private key, the payload having been encrypted asymmetrically. Next, the application instance LBD 500 recovers the entropy pool intended to be shared with the first television set-top box STB1 501 and sends in return a first response RSP targeting the node 513 of the topics tree. The first response RSP is intended for the first television set-top box STB1 501 and includes the entropy pool requested. The first response RSP is signed using the private key of the application instance LBD 500. The payload of the first response RSP contains the entropy pool requested and is encrypted asymmetrically with the public key of the addressee, namely the first television set-top box STB1 501, in order to ensure confidentiality thereof. When a plurality of entropy pools are liable to be used in the communication system, the payload preferentially further contains an entropy pool identifier. For example, the first response RSP is in accordance with the format illustrated in FIG. 6. In the step 525, the first response RSP is encapsulated in a message in accordance with the protocol for exchanges with the message broker BRK 120, which means that, through this encapsulation, the message is sent by the application instance LBD 500 to the message broker BRK 120.

In a step 526, the message broker BRK 120 detects that the first response RSP is targeting the node 513 of the topics tree, via which the first television set-top box STB1 501 took out a subscription at the step 522, and then propagates the first response RSP to the first television set-top box STB1 501. To do this, the message broker BRK 120 de-encapsulates the message transmitted by the application instance LBD 500 and re-encapsulates the first response RSP in a message in accordance with the protocol for exchanges with the message broker BRK 120, which means that, through this encapsulation, the message is sent by the message broker BRK 120 to the first television set-top box STB1 501. On reception of the first response RSP, the first television set-top box STB1 501 de-encapsulates the message transmitted by the message broker BRK 120 and checks that the first response RSP is signed by the private key of the application instance LBD 500 from which said first response RSP comes.

If the first response RSP is not correctly signed, the first television set-top box STB1 501 ignores the first response RSP.

If the first response RSP is correctly signed, the first television set-top box STB1 501 deciphers the payload with its private key, the payload having been encrypted asymmetrically. The first television set-top box STB1 501 thus recovers, and stores in memory, the entropy pool supplied by the application instance LBD 500. This entropy pool is then shared between the application instance LBD 500 and the first television set-top box STB1 501. This entropy pool inherits the non-repudiation related to the way in which it was transmitted by the application instance LBD 500 to the first television set-top box STB1 501, and makes it possible to transmit subsequent messages between the application instance LBD 500 and the first television set-top box STB1 501 by virtue of a symmetrical encryption without losing the benefit of non-repudiation.

In a step 527, the second television set-top box STB2 502 transmits to the message broker BRK 120 a third subscription message SUB targeting the node 513 of the topics tree. The message broker BRK 120 then records that the second television set-top box STB2 502 has taken out a subscription via the node 513.

Subsequently, in a step 528, the second television set-top box STB2 502 sends a second request REQ targeting the node 512 of the topics tree. The second request REQ is intended for the application instance LBD 500 (which is preferentially the application instance LBD1 231 acting as an entry point of the cloud system CLD 210) and requests a transmission of an entropy pool for the second television set-top box STB2 502. The second request REQ is signed with the private key of the second television set-top box STB2 502. It is not strictly necessary for the second request REQ to contain a payload. If such is the case, the payload is encrypted asymmetrically using the public key of the addressee, namely the application instance LBD 500, in order to ensure confidentiality thereof. In step 528, the second request REQ is encapsulated in a message in accordance with the exchange protocol with the message broker BRK 120, which means that, through this encapsulation, the message is sent by the second television set top box STB2 502 to the message broker BRK 120.

In a step 529, the message broker BRK 120 detects that the second request REQ is targeting the node 512 of the topics tree, via which the application instance LBD 500 took out a subscription at the step 521, and then propagates the second request REQ to the application instance LBD 500. To do this, the message broker BRK 120 de-encapsulates the message transmitted by the second television set-top box STB2 502 and re-encapsulates the second request REQ in a message in accordance with the protocol for exchanges with the message broker BRK 120, which means that, through this encapsulation, the message is sent by the message broker BRK 120 to the application instance LBD 500.

In a step 530, the application instance LBD 500 de-encapsulates the message received from the message broker BRK 120. The application instance LBD 500 checks that the second request REQ is signed by the private key of the second television set-top box STB2 502 from which said second request REQ comes.

If the second request REQ is not correctly signed, the application instance LBD 500 ignores the second request REQ.

If the second request REQ is correctly signed and the second request REQ contains a payload, the application instance LBD 500 deciphers the payload with its private key, the payload having been encrypted asymmetrically. Next the application instance LBD 500 recovers the entropy pool intended to be shared with the second television set-top box STB2 502 (which may, or may not, be the same as the one previously shared with the first set-top box STB1 501) and in return sends a second response RSP targeting the node 513 of the topics tree. The second response RSP is intended for the second television set-top box STB2 502 and includes the entropy pool requested. The second response RSP is signed by the private key of the application instance LBD 500. The payload of the second response RSP contains the entropy pool requested and is encrypted asymmetrically with the public key of the addressee, namely the second television set-top box STB2 502, in order to ensure confidentiality thereof. When a plurality of entropy pools are liable to be used in the communication system, the payload preferentially also contains an entropy pool identifier. For example, the second response RSP is in accordance with the format illustrated in FIG. 6. In the step 530, the second response RSP is encapsulated in a message in accordance with the protocol for exchanges with the message broker BRK 120, which means that, through this encapsulation, the message is sent by the application instance LBD 500 to the message broker BRK 120.

In a step 531, the message broker BRK 120 detects that the second response RSP is targeting the node 513 of the topics tree, via which the first television set-top box STB1 501 took out a subscription at the step 522 and via which the second television set-top box STB2 502 took out a subscription at the step 527. The message broker BRK 120 then propagates the second response RSP to the first television set-top box STB1 501 in a step 531 and propagates the second response RSP to the second television set-top box STB2 502 in a step 532. To do this, the message broker BRK 120 de-encapsulates the message transmitted by the application instance LBD 500 and re-encapsulates the second response RSP in two messages in accordance with the protocol for exchanges with the message broker BRK 120. Through this encapsulation, one of these messages is sent by the message broker BRK 120 to the first television set-top box STB1 501 and another of these messages is sent by the message broker BRK 120 to the second television set-top box STB2 502. The first television set-top box STB1 501 detects that the second response RSP is not intended for it and ignores the second response RSP.

On reception of the second response RSP, the second television set-top box STB2 502 de-encapsulates the message transmitted by the message broker BRK 120 and checks that the second response RSP is signed by the private key of the application instance LBD 500 from which said second response RSP comes.

If the second response RSP is not correctly signed, the second television set-top box STB2 502 ignores the second response RSP.

If the second response RSP is correctly signed, the second television set-top box STB2 502 deciphers the payload with its private key, the payload having been encrypted asymmetrically. The second television set-top box STB2 502 thus recovers, and stores in memory, the entropy pool supplied by the application instance LBD 500. This entropy pool is then shared between the application instance LBD 500 and the second television set-top box STB2 502. This entropy pool inherits the non-repudiation related to the way in which it was transmitted by the application instances LBD 500 to the second television set-top box STB2 502, and makes it possible to transmit subsequent messages between the application instance LBD 500 and the second television set-top box STB2 502 by means of a symmetrical encryption without losing the benefit of non-repudiation.

Figure 6:
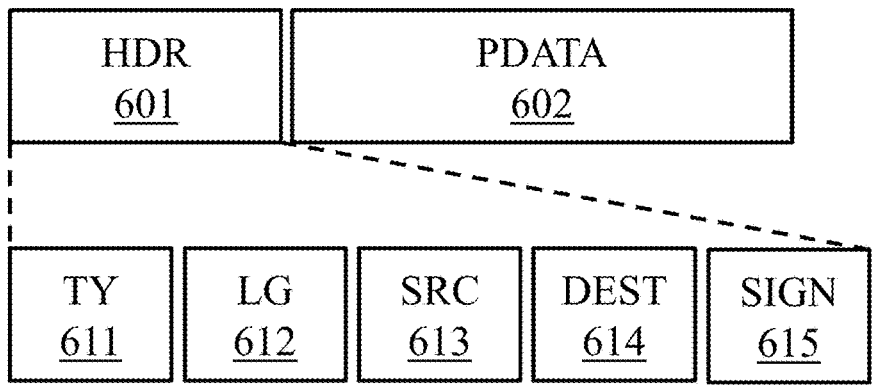
FIG. 6 illustrates schematically an example of a signalling message format for the entropy pool sharing.

FIG. 6 illustrates schematically an example of a signalling message format for the entropy pool sharing. The message format in FIG. 6 is thus adapted to the transmissions of requests REQ and responses RSP mentioned in the context of FIG. 5. The message format in FIG. 6 does not show the encapsulation related to the protocol for exchanges with the message broker BRK 120.

The message has a header HDR 601 and potentially a payload PDATA 602 encrypted by asymmetric encryption. The header HDR 601 includes a field TY 611 indicating the type of message (request, response), a field LG 612 indicating the size of the payload PDATA 602, a field SRC 613 identifying the source of the message, a field DEST 614 identifying the addressee of the message, and a field SIGN 615 comprising the signature of the message. The signing of the message is performed with the private key of the source of the message and the encryption of the payload PDATA 602 is performed with the public key of the addressee.

All the data (header plus payload) of the message are thus considered to be sensitive and are covered by the integrity function of the signature. The payload is thus also considered to be confidential and is protected by asymmetric encryption.

Figure 7:
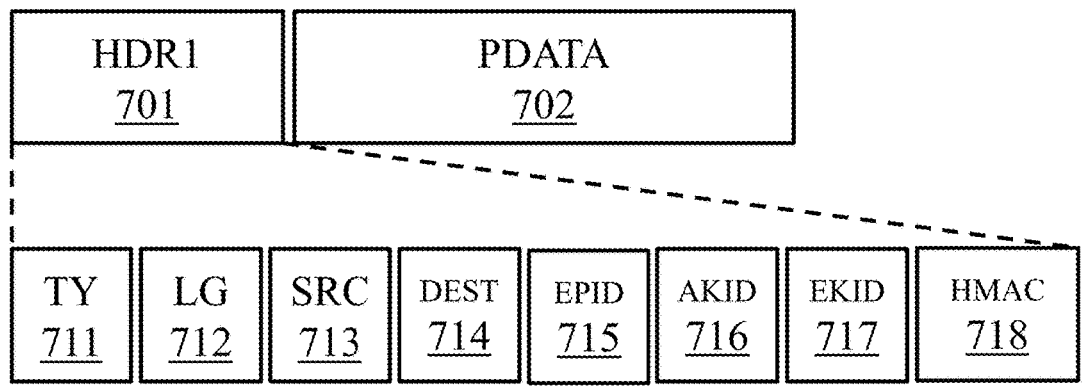
FIG. 7 illustrates schematically a first example of a message format protected by means of the entropy pool sharing.
Figure 8:
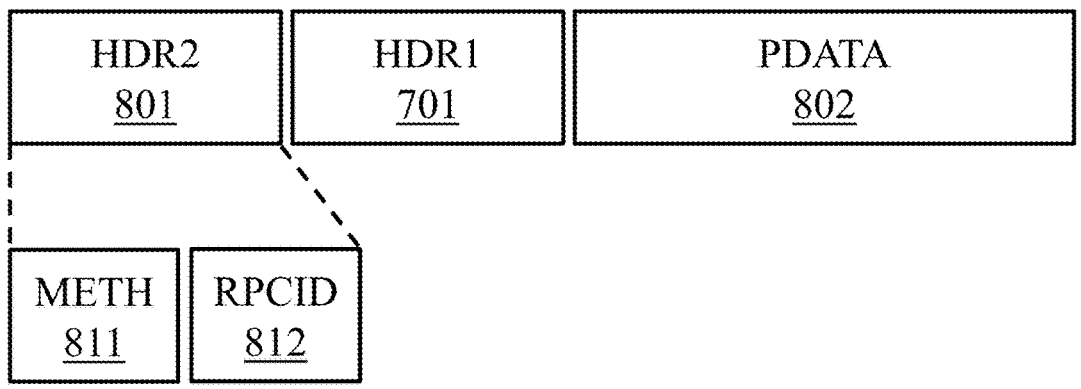
FIG. 8 illustrates schematically a second example of a message format protected by means of the entropy pool sharing.

FIG. 7 illustrates schematically a first example of a message format protected by means of the entropy pool sharing. The message format in FIG. 7 is thus adapted to the transmissions of data via the message broker BRK 120, once the corresponding entropy pool has been shared. The message format in FIG. 7 is adapted to the messaging mechanisms of the Publish-Subscribe type. The message format in FIG. 7 does not show the encapsulation related to the protocol for exchanges with the message broker BRK 120.

The message has a header HDR1 701 and payload PDATA 702 encrypted by symmetrical encryption. The header HDR1 701 includes a field TY 711 indicating the type of message, a field LG 712 indicating the size of the payload PDATA 702, a field SRC 713 identifying the source of the message and a field DEST 714 identifying the addressee of the message. The header HDR1 701 also includes a field AKID 716 identifying an authentication key constructed according to the entropy pool applicable for the transmission of the message in question. The field AKID 716 comprises for example a set of data indices of the entropy pool in question, as already explained in relation to FIG. 4. According to another example, the field AKID 716 comprises (if this is not the first message notifying the key in question) an index of an index aggregations table at which the index aggregation in question is stored.

The header HDR1 701 also includes a field EKID 717 identifying a symmetrical encryption key constructed according to the entropy pool applicable for the symmetrical encryption of the payload PDATA 702. The field EKID 717 comprises for example a set of data indices of the entropy pool in question, as already explained in relation to FIG. 4. According to another example, the field EKID 717 comprises (if this is not the first message notifying the key in question) an index of an index aggregations table at which the index aggregation in question is stored.

The header HDR1 701 also includes a field HMAC 718 that includes a message authentication code, preferentially of the HMAC type, to make it possible to authenticate and check the integrity of the message being received.

When a plurality of entropy pools are liable to be used in the communication system, the header HDR1 701 also comprises a field EPID 715 supplying an identifier of the entropy pool used for generating the authentication key identified by the field AKID 716 and the symmetrical encryption key identified by the field EKID 717.

All the data (header HDR1 701 plus payload PDATA 702) of the message are thus considered to be sensitive and are covered by the message authentication code, e.g. of the HMAC type. The payload PDATA 702 is thus also considered to be confidential and is protected by symmetrical encryption by means of the entropy pool applicable FIG. 8 illustrates schematically a second example of a message format protected by means of the entropy pool sharing. This second example of a protected message format repeats the first example illustrated schematically in FIG. 7, preceding the header HDR1 701 and the payload PDATA 802 with another header HDR2 801. The message format in FIG. 8 is adapted to the messaging mechanisms of the "routed RPC" type. The message format in FIG. 8 also does not show the encapsulation related to the protocol for exchanges with the message broker BRK 120.

The header HDR2 801 includes a field METH 811 identifying which type of RPC method is targeted by the message, for example of the Get or Set type, or of the Command or Response or Notify type. The header HDR2 801 also includes a field RPCID 812 providing an RPC identifier targeted by the message. This makes it possible not to use a specific request disclosing too much information, and to construct the header HDR1 701 and the payload PDATA 802 in the case of the messaging mechanisms of the Publish-Subscribe type.

The header HDR2 801 is not encrypted. The rest of the data (header HDR1 701 plus payload PDATA 802) of the message are thus considered to be sensitive and are covered by the message authentication code, e.g. of the HMAC type. The payload PDATA 802 is thus also considered to be confidential and is protected by symmetrical encryption by means of the entropy pool applicable.

Figures 9, 10:
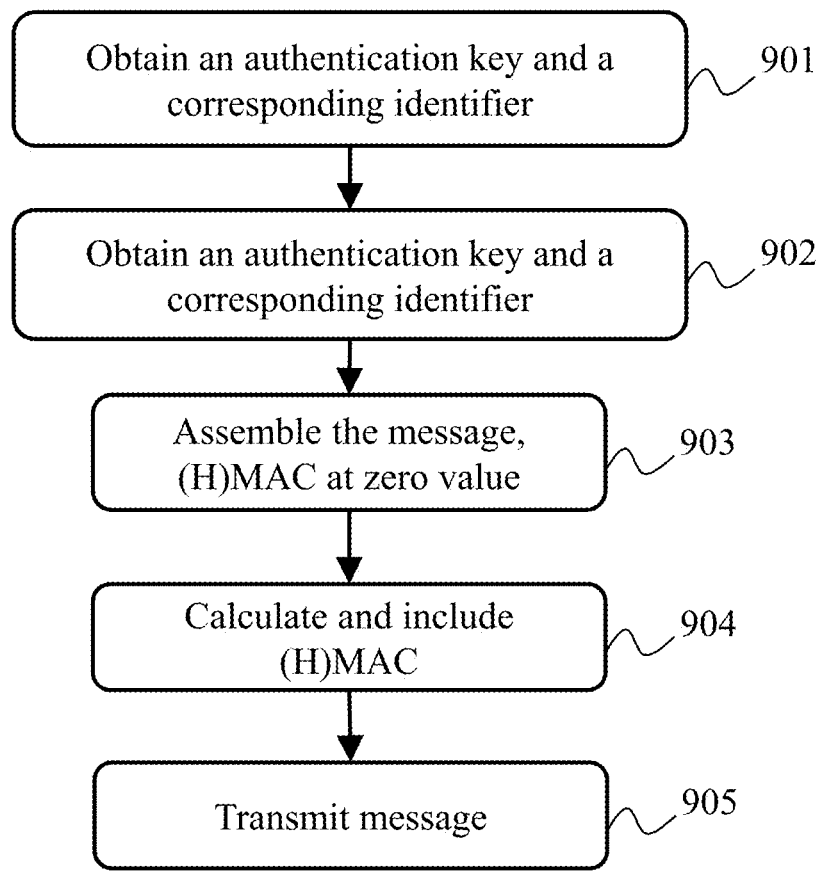
FIG. 9 illustrates schematically a message-sending algorithm protected by means of the entropy pool sharing.
FIG. 10 illustrates schematically an entropy pool arrangement.

FIG. 9 illustrates schematically an algorithm for the sending of a message protected by means of the entropy pool sharing. We shall consider by way of example that the algorithm in FIG. 9 is implemented by the proxy application PXY 130.

In a step 901, the proxy application PXY 130 obtains, from the entropy pool shared with the device, or the application, for which the secure message is intended, an authentication key and a corresponding authentication key identifier. As already indicated, this authentication key identifier is preferentially constructed by aggregating indices of data stored in the entropy pool in question. And, in another embodiment, beyond the first message, an index of an index aggregations table suffices for the following messages using the same key. This makes it possible to reduce the size of the header of these following messages.

In a step 902, the proxy application PXY 130 obtains, from the entropy pool shared with the device, or the application, for which the secure message is intended, a symmetrical encryption key and a corresponding symmetrical encryption key identifier. As already indicated, this symmetrical encryption key identifier is preferentially constructed by aggregating indices of data stored in the entropy pool in question. And, in another embodiment, beyond the first message, an index of an index aggregations table suffices for the following messages using the same key. This makes it possible to reduce the size of the header of these following messages.

In a step 903, the proxy application PXY 130 assembles the message while leaving the field intended to receive a message authentication code, for example of the HMAC type, at the zero value. The proxy application PXY 130 protects the payload by symmetrical encryption using the symmetrical encryption key obtained at the step 902. The proxy application PXY 130 inserts the identifier of the symmetrical encryption key, as well as the identifier of the authentication key obtained at the step 901, in the message header.

In a step 904, the proxy application PXY 130 calculates the message authentication code, for example of the HMAC type, on the message thus assembled. The proxy application PXY 130 then inserts the message authentication code calculated in the dedicated field which was initialised to the zero value. The message format in FIG. 7 or in FIG. 8 can be used.

In a step 905, the proxy application PXY 130 transmits to the message broker BRK 120 the message thus protected, encapsulating it in accordance with the message broker BRK 120. The authenticity and the integrity of the message can thus be checked in reception initially by checking the message authentication code by means of the authentication key (e.g. of the HMAC type), which is identified in the message header and is found by means of the shared entropy pool (optionally by passing through the index aggregations table), and the payload can be decrypted by means of the symmetrical encryption key (shared secret), which is also identified in the message header and is also found by means of the shared entropy pool (optionally passing through the index aggregations table).

The invention claimed is:

1. A method for secure end-to-end transmission of data between a first device and a second device via a message broker, wherein the method comprises;
    sharing an entropy pool between the first device and the second device via the message broker, by means of signalling messages, any payload of which is encrypted asymmetrically and which comprise a message signature; and
    transmitting subsequent messages between the first device and the second device via the message broker each said subsequent message comprising a header and a payload, the header comprising an identifier of an authentication key obtained from the shared entropy pool and an identifier of a symmetrical encryption key obtained from the shared entropy pool, the payload being encrypted symmetrically by means of the symmetrical encryption key, and the whole formed by the header and the payload being authenticated by means of a message authentication code obtained by means of the authentication key and inserted in the header.

2. The method according to claim 1, wherein the message authentication code is of the HMAC type.

3. The method according to claim 1, wherein the authentication key is obtained by aggregation of first data stored in the entropy pool and the identifier of the authentication key is obtained by aggregation of indices corresponding to said first data in the entropy pool.

4. The method according to claim 1, wherein the authentication key is obtained by aggregation of first data stored in the entropy pool and the identifier of the authentication key is an index of an index aggregation table at which the aggregation of the indices corresponding to said first data in the entropy pool is stored.

5. The method according to claim 1, wherein the symmetrical encryption key is obtained by aggregation of second data stored in the entropy pool and the identifier of the symmetrical encryption key is obtained by aggregation of indices corresponding to said second data in the entropy pool.

6. The method according to claim 1, wherein the symmetrical encryption key is obtained by aggregation of second data stored in the entropy pool and the identifier of the authentication key is an index of an index aggregation table at which the aggregation of the indices corresponding to said second data in the entropy pool is stored.

7. The method according to claim 1, wherein the first device performs, in the same way, secure end-to-end transmissions and receptions of data with a third device via the message broker, using the same entropy pool as with the second device.

8. The method according to claim 1, wherein the first device performs, in the same way, secure end-to-end transmissions and receptions of data with a third device via the message broker, using an entropy pool distinct from the entropy pool used with the second device.

9. The method according to claim 1, wherein the first device performs secure end-to-end transmissions of data to the second device and a third device via the message broker, using an entropy pool dedicated solely to the transmission of messages coming from the first device.

10. The method according to claim 1, wherein the first device performs secure end-to-end receptions of data coming from the second device and from a third device via the message broker using an entropy pool dedicated to the reception of messages by the first device.

11. The method according to claim 1, wherein the first device is a television set-top box and the second device is a terminal configured and adapted to control the television set-top box via the secure end-to-end transmission of data.

12. The method according to claim 1, wherein the first device is a cloud and the second device is a terminal configured and adapted for transmitting analytical data to the cloud via the secure end-to-end transmission of data.

13. The method according to claim 12, wherein the entropy pool is stored, in the cloud, in a database accessible to each application instance in communication with the second device.

14. A non-transitory storage medium storing a computer program comprising instructions for implementing, by a processor, the method according to claim 1, when said program is read and executed by said processor.

15. A first device adapted and configured for performing a secure end-to-end transmission of data with a second device via a message broker, wherein the first device comprises electronic circuitry configured for:

sharing an entropy pool between the first device and the second device via the message broker, by means of signaling messages any payload of which is encrypted asymmetrically and which comprise a message signature; and transmitting subsequent messages between the first device and the second device via the message broker, each said subsequent message comprising a header and a payload, the header comprising an identifier of an authentication key obtained from the shared entropy pool and an identifier of a symmetrical encryption key obtained from the shared entropy pool, the payload being encrypted symmetrically by means of the symmetrical encryption key, and the whole formed by the header and the payload, being authenticated by means of a message authentication code obtained by means of the authentication key and inserted in the header.

\* \* \* \* \*